United States Patent [19]
Maginness et al.

[11] 3,979,711
[45] Sept. 7, 1976

[54] ULTRASONIC TRANSDUCER ARRAY AND IMAGING SYSTEM

[75] Inventors: Maxwell G. Maginness, Palo Alto; James D. Meindl, Los Altos; James D. Plummer, Mountain View, all of Calif.

[73] Assignee: The Board of Trustees of Leland Stanford Junior University, Stanford, Calif.

[22] Filed: June 17, 1974

[21] Appl. No.: 480,609

[52] U.S. Cl. .............................. 340/1 R; 340/5 MP; 340/9; 340/10
[51] Int. Cl.² .................... G01S 9/66; H04R 17/00
[58] Field of Search ................. 340/1 R, 5 H, 5 MP, 340/10, 9; 73/67.8 R, 67.8 S

[56] References Cited
UNITED STATES PATENTS

| | | | |
|---|---|---|---|
| 3,086,195 | 4/1963 | Halliday | 73/67.8 S |
| 3,496,617 | 2/1970 | Cook et al. | 340/10 X |
| 3,600,936 | 8/1971 | Turner | 340/5 MP |
| 3,675,472 | 7/1972 | Kay et al. | 340/5 MP |
| 3,881,466 | 5/1975 | Wilcox | 340/5 MP X |
| 3,886,489 | 5/1975 | Jones | 340/5 MP |

FOREIGN PATENTS OR APPLICATIONS

| | | | |
|---|---|---|---|
| 1,244,551 | 9/1971 | United Kingdom | 340/5 MP |
| 144,314 | 2/1962 | U.S.S.R. | 73/67.8 S |

OTHER PUBLICATIONS

Takagi et al., *Acoustical Holography*, vol. 4 Plenum Press, 1972, pp. 215-236.

*Primary Examiner*—Richard A. Farley
*Attorney, Agent, or Firm*—Flehr, Hohbach, Test, Albritton & Herbert

[57] ABSTRACT

An ultrasonic bidirectional transducer array, and an imaging system including said array, wherein the array comprises a plurality of transducer elements each having a major face capable of bidirectionally transmitting and receiving ultrasonic energy and an opposite face. The transducer elements have their major bidirectional faces arrayed in a predetermined surface. Means is carried by the opposite face of each element for bidirectionally providing and receiving electrical energy across each transducer element. In the imaging system the array may be selectively scanned to provide successive displays of moving objects at a rate which gives the impression of continuous motion to a human observer.

4 Claims, 3 Drawing Figures

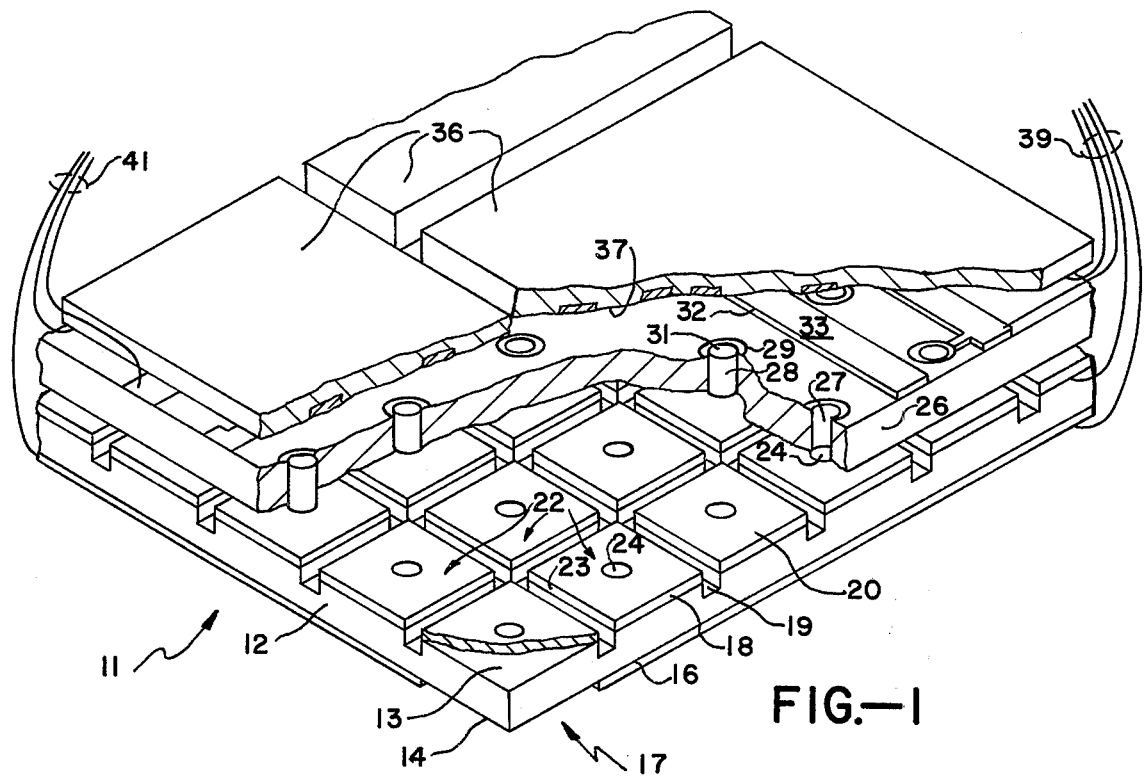
FIG.—1
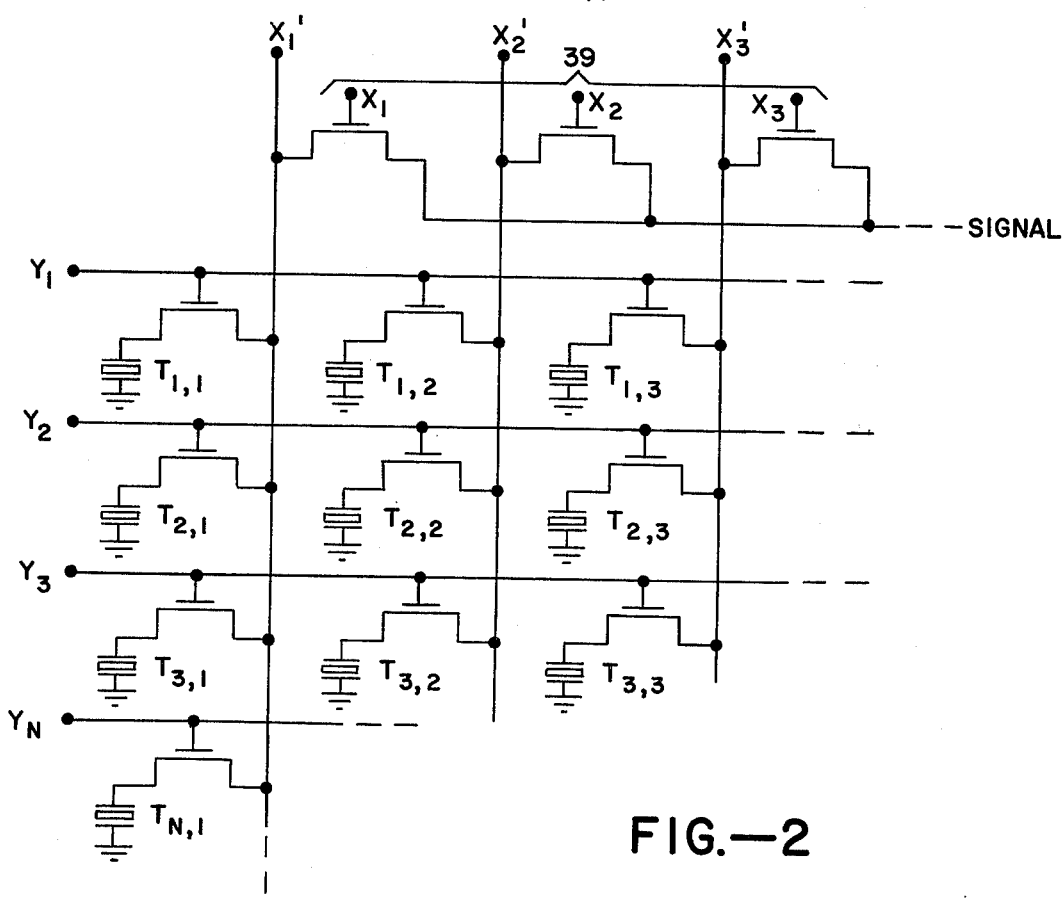
FIG.—2

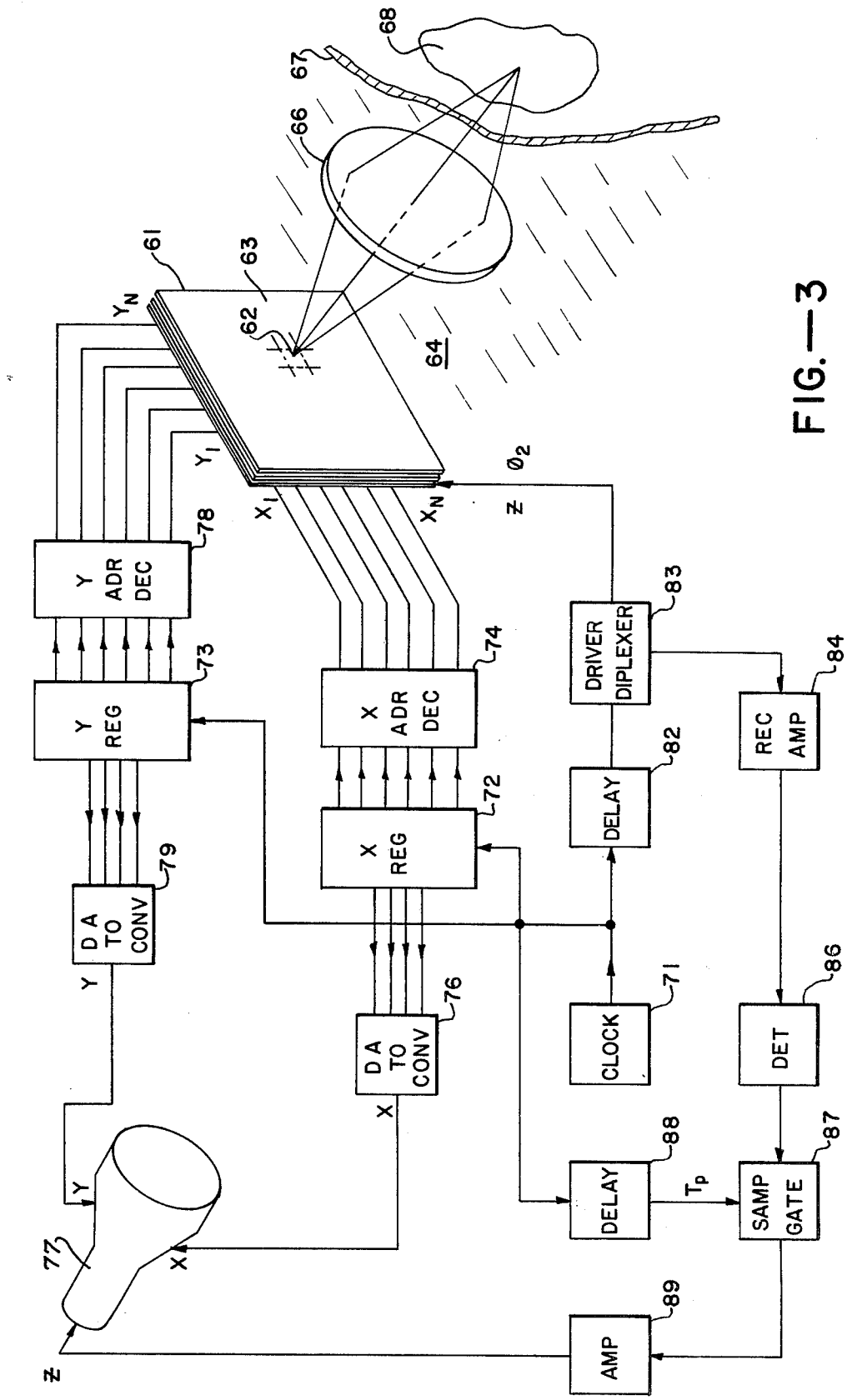
FIG.—3

ULTRASONIC TRANSDUCER ARRAY AND IMAGING SYSTEM

BACKGROUND OF THE INVENTION

This invention relates generally to ultrasonic imaging utilizing a transducer array and more particularly an ultransonic bidirectional transducer array in which each transducer can transmit and receive ultrasonic energy. The array may be included in an ultrasonic imaging system. In the system the transducers in the array are selectively scanned so that successive image samples provide ultrasonic imaging of moving objects.

Prior art systems for converting ultrasonic energy distributions having fine detail structure over an extended area into electrical form suitable for conversion to a visible display have not been satisfactory. Some of the systems are relatively insensitive, difficult to use, provide imprecise location of field sampling points and have poor response to transient signals. Other systems which overcome these disadvantages are unsatisfactory because they require that the objects viewed remain stationary for an extended period of time. In particular this fixed target requirement applies to systems which obtain the maximum possible resolution within the limits of aperture size and acoustic wavelength by transmitting and receiving from the same points within the insonified aperture.

OBJECTS AND SUMMARY OF THE INVENTION

It is a general object of the present invention to provide an improved ultrasonic transducer array and an imaging system including said array for ultrasonic imaging.

It is a particular object of the present invention to provide a bidirectional transducer array, and a system including said array which provides a fine detail structure over an extended area concomitantly with successive image sampling of the array at a rate which is sufficient to image moving objects.

The foregoing and other objects of the invention are achieved in an ultrasonic bidirectional transducer array, and an imaging system including said array, wherein the array comprises a plurality of transducer elements each having a major face capable of bidirectionally transmitting and receiving ultrasonic energy (bidirectional transducer array) and an opposite face. The transducer elements have their major bidirectional faces arrayed in a predetermined surface. Means is carried by the opposite face of each element for bidirectionally providing and receiving electrical energy across each transducer element. In the imaging system the array may be selectively scanned to provide successive displays of moving objects at a rate which gives the impression of continuous motion to a human observer.

BRIEF DESCRIPTION OF THE DRAWINGS

FIG. 1 is an enlarged isometric view, partly in the section, showing a portion of the bidirectional transducer array including a plurality of piezoelectric transducer elements and associated gating and control integrated circuitry carried by said transducer array.

FIG. 2 is a schematic diagram of a transducer array and associated addressing circuitry.

FIG. 3 is a symbolic block diagram of an ultrasonic imaging system including the bidirectional transducer array of the present invention.

DESCRIPTION OF THE PREFERRED EMBODIMENT

A bidirectional ultrasonic transducer array, and an imaging system including the array for imaging moving objects, are shown in the accompanying Figures. Briefly, in general overview, each transducer element of the array is adapted to function bidirectionally. That is, each element may radiate ultrasonic energy when a transmit signal is applied to the electrical terminals of the element. Further, each element may be responsive to receive ultrasonic energy and provide a corresponding received electrical signal output at the electrical terminals of the element. In imaging, a transducer element transmits a pulse of ultrasonic energy which passes via an acoustic lens to an acoustically reflective object. The reflected energy passes back through the acoustic lens to be received by the transducer element at a subsequent time determined by the propagation delay. As will be seen, the array of elements in an imaging system may be individually controlled at a rate sufficient for imaging of the signals received by the entire array. Because imaging system performance is directly determined by the transducer array, the array will first be described.

Referring to FIG. 1, the ultrasonic transducer array 11 is shown including a relatively thin wafer 12, which may be formed of piezoelectric material, having planar, substantially parallel top and bottom surfaces 13 and 14 respectively. A relatively thin conductive layer 16 is formed on surface 14. The outermost surface of layer 16 forms a major face 17 which, as will be seen, is capable of bidirectionally transmitting and receiving ultrasonic energy. A relatively thin additional conductive layer 18 is formed on surface 13. Next, a grid of isolation grooves 19 are formed in layer 18 extending from the surface 20 of said layer through the top surface 13 of wafer 12 and into wafer 12 to a depth intermediate the wafer top and bottom surfaces 13 and 14 respectively. The grid of isolation grooves thus formed define a plurality of isolated portions 22 comprising individual ultrasonic transducers having common lower terminals formed by and interconnected with conductive layer 16 and having additional terminals provided by the portions 23 of additional conductive layer 18, said plurality of isolated portions 23 of said additional layer 18 being carried by said top surface of said isolated portions of said wafer 12. Contact areas 24 are formed in the upper surface of each of said portions 23.

Next an isolating and support layer 26 is positioned on the upper surface 20 of the additional conductive layer 18. The insulating layer 26 may be formed on surface 20 and may be silicon dioxide. Insulating layer 26 has apertures 27 formed therein extending through layer 26 to generally expose contact areas 24.

Conductive means 28 such as conductive metal pillars are positioned in apertures 27 in electrical contact with contact areas 24 and extending to surface 29 of said insulating layer and forming a conductive surface 31 generally adjacent surface 29. To minimize acoustic interaction the pillars are relatively small in cross-section compared to the surface area of portions 22 and 23. Next a conductive metal layer 32 is formed on the surface 29 of layer 26 and is patterned to interconnect selected conductive surfaces 31. Further, patterned layer 32 has selected exposed portions 33.

Semiconductor wafer 36 having a substantially planar surface 37 may have active and passive devices formed in said body of said wafer and extending to surface 37. Selected exposed regions of said active and passive devices are arrayed at surface 37 and in a predetermined relationship so that when surface 37 is placed in a confronting, electrically contacting relationship with metal layer 32 certain of said selected regions contact other of selected portions 33 of said patterned metal layer 32. The semiconductor wafer 36 is thus carried by the upper surface of patterned metal interconnecting layer 32 and selected active and passive devices having selected regions at said planar surface 37 are in electrically conductive engagement with predetermined portions 33 of layer 32. Lead means 39 and 41 are provided to selectively contact portions of said conductive layer, said interconnecting layer 32 and selected portions of wafer 36 at the exposed surface 37 for providing contact with external electrical circuitry. Lead means 39 and 41 and associated devices configure the array and associated circuitry into X-Y coordinate, uniquely addressable elements.

A schematic diagram of a circuit for addressing the array transducers $T_{1,1} - T_{1,N}$; $T_{2,1} - T_{2,N}$; and $T_{N,N}$ is shown in FIG. 2. The switching elements shown are field effect transistors with one field effect device connected at each cross point of the circuit and one field effect switching element connected between the signal line and the vertical $X_1 - X_N$ lines of the array. Thus, by applying appropriate switching voltages to the $X_1 - X_N$ and $Y_1 - Y_N$ lines, it is possible to select anyone of the transducers. By connecting to extensions $X_1' - X_N'$ it is possible to address the elements in any column directly. It is to be understood that the above is only illustrative of a possible switching arrangement for selectively addressing transducers. Other switching elements such as switch transistors, etc. may be used at the cross points and for the X and Y addresses.

Referring to FIG. 3, an ultrasonic imaging system including the bidirectional transducer array is shown. Transducer array 61 includes a plurality of transducer elements 62 arrayed with their bidirectional faces in a substantially planar surface 63. Transducer elements 62 are arrayed in an X-Y cartesian coordinate system wherein the Y coordinates may be addresed by lines $Y_1 - Y_N$ and the X coordinates by lines $X_1 - X_N$. The actuation of one Y address line $Y_Y$ and one X address line $X_X$ determines a unique transducer element and associated circuitry. Unique address lines connect bidirectional signal line Z to said unique element. Each unique element, such as element 62, is in communication with ultrasonic medium 64 which is positioned between array 61 and the object to be viewed 68. A containing wall 67 may be placed intermediate the object and the transducer array in actual applications, and moreover an acoustic lens 66 may be further provided intermediate the array and said object to bidirectionally focus transmitted ultrasonic information from said array to said object 68, and vice versa, to refract ultrasonic energy from object 68 back to element 62. Of course, for operation of the array and the imaging system, element 62 is in ultrasonic communication with object 68 and thus the path from element 62 to object 68 and the return path must be relatively ultrasonically transparent or translucent.

In the address portion of the ultrasonic system a clock 71 is provided having an output connected to the serial clock inputs of X register 72 and Y register 73. Registers 72 and 73 may be serial shift input, parallel access output conventional shift registers. Register 72 has a plurality of parallel-access outputs connected to the input of X address decoder 74. The plurality of outputs from X address decoder 74 are connected to the plurality of address line $X_1 - X_N$ connected to the array 61. An additional plurality of outputs from X register 72 are connected to the inputs of digital to analog (D to A) converter 76. The output of converter 76 is connected to the X analog input of display 77. Converter 76 may include conventional digital to analog conversion circuitry, being responsive to a digital signal input to provide a corresponding analog signal output. Similar address circuitry is provided for the Y address. Y register 73 has a plurality of parallel access outputs connected to a plurality of inputs of Y address decoder 78. The plurality of outputs from Y address decoder 78 are connected to the Y address lines $Y_1 - Y_N$ of array 63. An additional plurality of outputs from Y register 73 are connected to D to A converter 79. Converter 79 has an analog output connected to the Y analog input of display 77.

In the signal processing circuitry, address delay 82 has an input connected to the output of clock 71. The output of address delay 82 is connected to the input of driver diplexer 83. A first output of driver diplexer 83 is connected to data line Z which is connected in accord with the address circuitry carried by array 61 to the unique transducer element 63 addressed so that signal $\theta_Z$ may be bidirectionally transmitted and the return from said signal received at driver diplexer 83. An additional output of driver diplexer 83 is connected to the input of receive amplifier 84. The output of receive amplifier 84 is connected to the input of detector 86, and the output of detector 86 is connected to the input of sample gate 87. An additional input to sample gate 87 is connected to the output of propagation delay circuitry 88. Propagation delay circuit 88 has an input connected to the output of clock 71 and, as will be later described, provides a gate signal $T_P$ to sample gate 87. The output of sample gate 87 is connected to the input of Z amplifier 89 and the output of Z amplifier 89 is connected to the Z input of display 77. This may correspond to the intensity modulated signal input of a cathode ray tube display, and the X and Y inputs would correspond to the orthogonal electrostatic deflection plates of the tube.

Turning to operation of the system, the output signal K from clock 71 provides a serial shift input to registers 72 and 73 and provides via decoder 74 and 78 the unique address of an individual transducer element. Signal K simultaneously drives address delay 82 which provides a delay sufficient to complete the address cycle to access an individual transducer element 62. At the end of the address cycle, address delay circuit 82 provides input signal to driver diplexer 83 which provides an output transmit signal on line Z to the addressed transducer element and causes said element to transmit ultrasonic energy through medium 64, being focused by lens 66 through containing wall 67 and be received by object 68. Simultaneously with the transmit cycle, the clock K signal has also been provided to propagation delay circuit 88. Propagation delay circuit 88 may provide a variable delay which corresponds to the propagation time selected, that is, the time interval of interest measured from the initiation of the transmit signal to the desired return signal, in accord with the time required for propagation of the ultrasonic energy over the transmit and receive path. The output of propagation delay 88 is a signal $T_P$ which has a delay corresponding to the propagation time and has an interval sufficient for receipt of the return or "echo" pulse. This $T_P$ provides a time gating signal to eliminate undesired background and artifact signals.

Returning then to the receive portion of the imaging cycle, the ultrasonic energy is reflected by object 68 and is returned via lens 66 to element 62. Element 62 now receives the reflected signal and passes said signal via diplexer 83 to the input of receive amplifier 84. Amplifier 84 amplifies the return signal, and detector 86 detects the signal information contained therein. The entire detected signal return is provided at the input of sample gate 87. However, only at a time interval corresponding to the desired propagation delay, that is, the signal which coincides with a selected time interval $T_P$ passes through gate 87 and is amplified by Z amplifier 89 and is thus displayed on display 87.

It is further apparent that with each additional pulse K of clock 71, that the array 61 may be sequentially scanned and the imaged information displayed across the X–Y coordinates of display 77 and with variable amplitude intensity according to the input Z. Of course, it is possible to sequentially scan only one row or column as may be desired. It has been found that if 10 or more scans are taken per second, a display 77 with suitable persistence gives the impression of moving objects at display 77. Further, focusing at different object depths may be accomplished by maintaining array 61 and lens 66 in constant relative relationship and moving the combination relative to wall 67 and object 68.

Although a single transmit, return and display cycle is shown, it is, of course, understood that if an increased sampling rate is required to follow a moving object, then entire rows such as $X_1'$ may simultaneously transmit. An array of driver diplexers 83 and associated amplifier and transmit circuitry may then be provided, each circuit combination connected to one $X_1' - X_N'$ line. Sequential transmission from a number of elements separated by ten microseconds followed by reception five hundred microseconds later can also be employed using one transmitter and one receiver. The output of the increased sampling, may, of course, be stored in additional buffer storage at the output of each sampled channel and the stored information then displayed by sweeping the X axis of the display and the corresponding signal information Z such that the display may be refreshed from the stored output. The buffer storage may be typically a bank of capacitors connected to the output of plural sampling gates 87. The signal Z stored of each of the capacitors is then caused to be displayed along the X axis of display 77.

Additional combinations with the presently disclosed system may also be provided. For example, lens 66 may be omitted and individual elements scanned, and the individual, received amplitudes displayed to provide a display similar to the well known "A scan" presentation. Moreover, additional electrical processing circuitry may be provided to simulate the effect of a physical lens 66. Or, a combination of a physical lens and electrical processing may be used, such as a modified lens to perform a spatial Fourier transform of the acoustic echo pattern in combination with angular scanning formed by electronic delay means such as tapped delay lines.

Additionally, although not necessarily suited for moving objects, the signals from the array may be recorded and processed by means analogous to the means well known in synthetic aperture radar systems.

It is to be noted that the transmission and subsequent reception of a signal at the same bidirectional transducer face provides directional resolution approximately twice that possible with a receive-only array.

Thus, it is apparent that there has been provided an improved ultrasonic transducer array and an imaging system including said array for ultrasonic imaging. More particularly a bidirectional transducer array has been provided and an improved imaging system including said array provides fine detail structure over an extended area and at the same time provides successive image sampling of the array at a rate which is sufficient to image moving objects.

We claim:

1. In an ultrasonic transducer array, a relatively thin wafer of piezoelectric material having planar, substantially parallel top and bottom surfaces, a relatively thin conductive layer formed on said bottom surface, said outermost surface of said layer forming a major face capable of bidirectionally transmitting and receiving ultrasonic energy, a relatively thin additional conductive layer formed on said top surface having a grid of isolation grooves formed therein extending from the surface of said additional layer through said wafer top surface and into said wafer to a depth intermediate said wafer top and bottom surfaces to define a plurality of isolated portions in said wafer, a plurality of isolated portions of said additional conductive layer being carried by said top surface of said isolated portions of said wafer, and a contact area formed in the upper surface of each of said portions of said additional conductive layer.

2. A transducer array as in claim 1 together with an insulating layer carried by the upper surface of said portions of said additional conductive layer, said insulating layer having apertures formed therein exposing the contact areas formed in the top surface of said isolated portions of said additional conductive layer, conductive means formed in said apertures in electrical contact with said contact areas and extending to the surface of said insulating layer to form a plurality of conductive surfaces, a patterned metal interconnecting layer formed on said insulating layer and contacting a predetermined exposed contact surface, a semiconductor wafer having a substantially planar surface including a plurality of semiconductor active and passive devices including regions formed in said wafer extending to said planar surface of said wafer and having portions of said regions exposed at said planar surface, said semiconductor wafer being carried by the upper surface of said patterned metal interconnecting layer, wherein said exposed regions at said planar surface of said wafer are in electrically conductive engagement with predetermined portions of said patterned metal layer.

3. The transducer array of claim 1 together with means connected to the first named conductive layer and to the contact areas of the isolated portions of the additional conductive layer for bi-directionally providing and receiving electrical energy across the transducer elements formed thereby.

4. The transducer array of claim 3 wherein the means for providing and receiving electrical energy comprises circuitry in the form of a semiconductor wafer adjacent to the wafer of piezoelectric material and connected to the contact areas of the additional conductive layer.

* * * * *